June 28, 1932.  J. W. PETERSON  1,864,929
METHOD FOR THE MANUFACTURE OF BRAKE SHOES
Original Filed Jan. 10, 1927
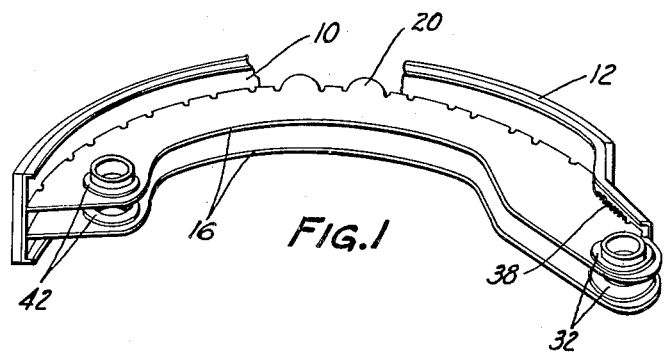
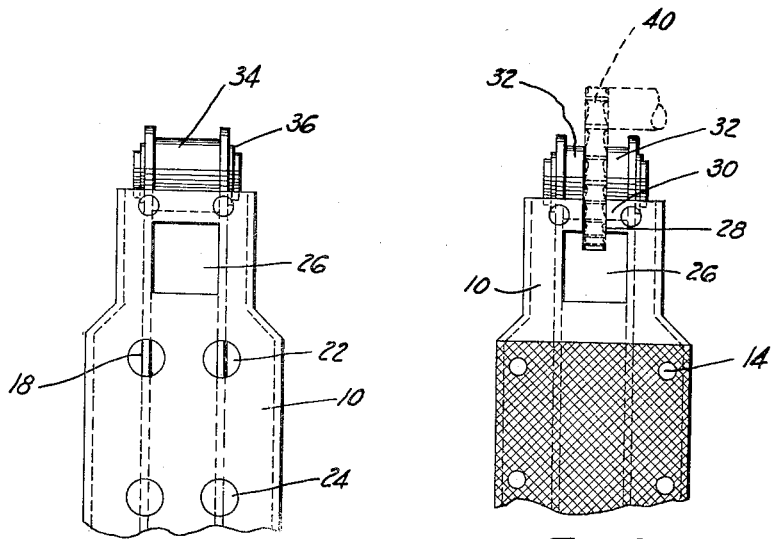
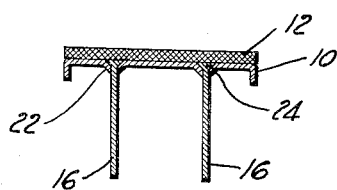
INVENTOR.
JOHN W. PETERSON
BY
ATTORNEY.

Patented June 28, 1932

1,864,929

UNITED STATES PATENT OFFICE

JOHN W. PETERSON, OF SOUTH BEND, INDIANA, ASSIGNOR TO BENDIX BRAKE COMPANY, OF SOUTH BEND, INDIANA, A CORPORATION OF ILLINOIS

METHOD FOR THE MANUFACTURE OF BRAKE SHOES

Original application filed January 10, 1927, Serial No. 160,016. Divided and this application filed July 14, 1931. Serial No. 550,717.

This invention relates to brake shoes, and more particularly to shoes for internal expanding brakes.

An object of the invention is to provide a substantial shoe, and to facilitate its manufacture by an improved method.

The shoe is preferably manufactured with an outer band, supporting a brake lining and reinforced by one or more stiffening members or webs.

An important feature of the invention relates to providing the edge of the web with projections passing through slots in the band and preferably welded thereto. Preferably the band is formed with depressions surrounding the slots and the projections are so welded that the material of the projections flows into and substantially fills the depressions. This provides in effect integral rivet heads for securing the web to the band, thus greatly facilitating the assembly of these parts.

Another feature of the invention relates to securing absolute alinement of spaced bearings at the end of the shoe, and of such bearings with respect to a slot formed in the shoe for the passage of the end of an auxiliary shoe, by initially building up the shoe with a single long bearing member and without any slot, and then separating the bearing member into two spaced bearings, by a cut which removes the required amount of material to secure the desired spacing of the bearings and which also forms the desired slot in the shoe itself.

The above and other objects and features of the invention will be apparent from the following description taken in connection with the accompanying drawing which forms a part of this specification, and in which:

Figure 1 is a perspective view of the finished shoe;

Figure 3 is an elevation of one end of the finished shoe;

Figure 2 is a similar view before the lining is attached and before the final cut separating the two bearings is made, and Figure 4 is a cross sectional view.

The illustrated shoe is the secondary shoe of a three-shoe brake. It is intended to be anchored on a pivot at one end, at which end it overlaps the anchored end of a cooperating auxiliary shoe, and at its opposite end it is intended to be connected by a floating pivot to the servo or primary shoe. The present invention relates to the structure of the shoe and more particularly to the manufacture thereof.

The shoe comprises an arcuate band 10, to which a lining 12 is shown secured as by rivets 14, and two reinforcing members or stiffening webs 16 secured to the inner face of the band 10. The webs 16 are spaced apart so that at their ends they may straddle the ends of the primary and auxiliary shoes of the brake.

An important feature of the invention relates to the manner of securely fastening the band 10 and webs 16 together. The band is formed with a series of slots 18 to fit over projections 20 on the edge of the web.

Each slot 18 is preferably surrounded by a depression 22, and after the parts are assembled the projections 20 are melted down in a welding operation of the general type of spot-welding, substantially to fill the depressions 22 and to form in effect integral rivet heads 24. Since the welding heats the parts, on cooling down after the welding the web 16 and projections 20 shrink, this forming a very tight and close joint with band 10.

At the end of the finished shoe there is an opening 26 for the passage of the anchored end of the adjacent auxiliary shoe, and which is narrowed down at the end of the shoe to form a mere slot 28, just wide enough to position the auxiliary shoe laterally, extending between lugs 30 on the band 10 and two bushings or bearings 32 secured to the webs 16 and adapted to be mounted on the anchor or fixed pivot of the shoe.

To insure the greatest accuracy of the slot 28, and of the alinement of bearings 32, the shoe is preferably made up to the last operation as shown in Figure 2. As shown, there is provided an opening 26 in band 10, and a single bearing member 34 having shoulders at its ends to engage the inner faces of webs 16. Flanges 36 on the ends of bearing member 34 are peened or spun over against the outer faces of webs 16, to lock the ends of the bearing member to the webs, or if preferred the ends of the bearing member may be welded permanently to the webs. To strengthen the end of the shoe, arc welds 38 extend from the end of band 10 along the junction with webs 16, at least past the opening 26.

After completing the shoe to the stage shown in Figure 2, the slot 28 is formed by removing the surplus material, as for example by a cutter 40 indicated in dotted lines in Fig. 3. This also separates member 34 into two bearings 32 absolutely alined with slot 28, and with each other.

At the opposite end of the shoe, bearings 42 may be welded or otherwise secured to webs 16, for the floating pivot of the primary or servo shoe.

This application is a division of my pending application Serial No. 160,016, filed January 10, 1927, and is made in accordance with requirements of the United States Patent Office under provision of Rule 42.

While a particular shoe, and particular steps in its manufacture, have been described in detail, it is not my intention to limit the scope of the invention by such description, or otherwise than by the terms of the appended claims.

Having thus described the invention, what I claim as new and desire to secure by Letters Patent, is:

1. That method of forming a brake shoe with spaced parts supporting alined bearings comprising providing the parts with a single bearing, and splitting the bearing transversely.

2. That method of forming a brake shoe with spaced parts supporting alined bearings comprising boring the spaced parts transversely, fitting a single bearing in the bore and splitting the bearing transversely.

3. That method of forming a brake shoe with spaced parts supporting alined bearings comprising fitting a single bearing to the spaced parts in transverse relation thereto, securing the bearing in position and splitting the bearing transversely.

4. That method of forming a brake shoe with spaced parts supporting alined bearings comprising fitting a single bearing to the spaced parts and cutting away a part of the bearing between the parts.

5. That method of forming a brake shoe with spaced parts supporting alined bearings comprising fitting a bearing to the parts in transverse relation thereto, deforming the ends of the bearing, securing the bearing to the spaced parts and removing a part of the bearing between the spaced parts.

6. That method of forming a brake shoe with spaced parts provided with alined bearings separated by an intervening space, which comprises providing said parts with a single bearing member extending across said space and securing said member to said parts, and then separating said member into two alined bearings by removing material to form said intervening space.

7. That method of manufacturing a brake shoe which comprises securing a band across strengthening means including at least at the end of the shoe two spaced parts, providing the band near its end with an opening between the spaced parts, providing the spaced parts with a single bearing member extending crosswise of the shoe, and then manipulating cutting means to remove material to form a slot extending from the end of the shoe into said opening and at the same time to separate the bearing member into two bearings separated by an intervening space.

8. That method of manufacturing a brake shoe which comprises securing a band across strengthening means including at least at the end of the shoe two spaced parts, providing the spaced parts with a single bearing member extending crosswise of the shoe, and then manipulating cutting means to remove material to form a slot extending into the end of the band from the end of the shoe and at the same time to separate the bearing member into two bearings separated by an intervening space.

In testimony whereof, I have hereunto signed my name.

JOHN W. PETERSON.